April 7, 1964     E. UMBRICHT     3,128,320
GAS WASHING WITH LIQUID SPRAY

Filed Sept. 28, 1961     2 Sheets-Sheet 1

INVENTOR.
EMIL UMBRICHT
BY
Curtis, Morris & Safford
ATTORNEYS

April 7, 1964  E. UMBRICHT  3,128,320
GAS WASHING WITH LIQUID SPRAY
Filed Sept. 28, 1961  2 Sheets-Sheet 2

INVENTOR.
EMIL UMBRICHT
BY Curtis, Morris & Safford
ATTORNEYS

United States Patent Office 3,128,320
Patented Apr. 7, 1964

3,128,320
GAS WASHING WITH LIQUID SPRAY
Emil Umbricht, Northville, Mich., assignor to Ajem
Laboratories, Inc., Livonia, Mich.
Filed Sept. 28, 1961, Ser. No. 141,502
4 Claims. (Cl. 261—29)

This invention relates to the washing of gases with liquid spray droplets forcibly driven across the path of the gas stream through washing apparatus for the removal of dust and fumes from the gas and, more particularly, to such gas washing wherein the stream of gas to be washed is introduced tangentially around and below a rotating spray pattern of liquid droplets and through an asymmetrical distributing path around the rotating spray pattern.

As well understood, gas washing apparatus of the character to which this invention relates is utilized in a wide variety of installations for the removal from streams of air or other gases various solid or liquid or gaseous entrained matter such as paint fumes or pain killing materials, contaminants in exhaust fumes from furnace operations, dust or dirt or fibers carried by forced draft exhaust systems, a variety of industrial operations, etc., with the liquid droplets of washing spray serving to wet the contaminating materials entrained in the gas and to expedite or effect the removal and collection of the entrained materials in the washing liquid or otherwise prior to ultimately exhausting the cleaned gas from the washing apparatus.

Considering the washing of air as illustrative of a situation to which this invention relates, a variety of apparatus, constructions, and methods have been developed for such use. Among these may be noted, merely as generally indicative of the area to which this invention relates, those disclosed in such patents as 2,949,285, 2,599,202, etc. In such arrangements, the air to be washed enters the apparatus below a washing liquid spray, and passes upwardly through the spray pattern engendered by a rotating distributor of spray droplets, and then continues tortuously through a baffle chamber for the removal of entrained material. For increased washer efficiency, it may be desired to attempt to distribute the entering air around the spray pattern so that the upward travel of the air through the spray pattern assumes a more or less uniform distribution across the washing chamber.

If such distribution is attempted with static distributing baffles, for example, some difficulty may be experienced from imparting a high linear velocity to the entering air and/or discovering a non-uniform passage of the gas to be washed upwardly through the spray pattern so that there may be some channeling of air through certain segments of the spray pattern with a possible loss in overall efficiency of washing. Similarly, if it is attempted to distribute the entering air around the whole periphery of the cylindrical washing chamber or rotating spray pattern by means of some sort of overhanging baffle, difficulty may be experienced from a tendency of entrained solid or other soils to deposit and accumulate on the inside of the underside of such a distributing baffle as a result, perhaps, of direction and velocity changes of the entrained air therein and/or the existence of a semi-dry boundary within the baffled area which is protected from flushing or washing by washing liquid from the spray pattern. Indeed, such difficulties may even be experienced if a curved or overhanging baffle be spaced somewhat from the outer casing of the apparatus to permit washing liquid which has impinged on the walls of the apparatus to trickle or run down behind or outside such a distributing baffle.

Particularly in certain applications and where high efficiency of the washing apparatus (in terms of size, power consumption, and washing liquid used per volume of air washed) and a high throughput rate are desired, some or all of the above difficulties, or others, may be experienced whether a distributing baffle is arranged all or only part of the way around the periphery of the rotating spray pattern and/or otherwise may result from non-uniform rates of air passing under the inner and lower edge of such a static distributor at various angular positions around the apparatus so that air to be washed is not presented for transfer through the rotating spray pattern with a desired or maximum uniformity at all angular positions around or through the available spray washing area.

According to this invention, however, there is provided an arrangement for the washing of gases in the manner described whereby the gas stream is tangentially introduced into the apparatus below the washing spray and with a swirling or helical motion into a helical distributing path defined by an asymmetrical distributing baffle of diminishing cross section and open at the bottom, so that the entering air gradually passes out from under the distributing baffle and more or less uniformly therealong and around the washing chamber, and then reverses direction to pass with a swirling or helical motion upwardly through the rotating spray pattern, to proceed on a tortuous path thereafter to be exhausted from the washing operation, and, preferably, with the direction of swirling motion imparted to the entering gas being related to the direction of rotation of the spray pattern for increasing or decreasing the force or time of impact between spray droplets of washing liquid and entrained minute particles or droplets of soil in the gas stream to be washed.

As a further feature of this invention, there is also preferably provided deflecting members or spray openings at various spaced points around the distributing baffle in accordance herewith for entrance and deflection of some of the washing liquid spray droplets into the distributing path within or under the distributing baffle for flushing of the inside thereof to remove or prevent deposits or accumulations of soils adhering thereto from the entering stream of gases to be washed, and, preferably, to form a downwardly flowing substantially continuous annular curtain of washing liquid through which the gases to be washed are passed even prior to contacting the rotating spray pattern of washing liquid droplets.

With the foregoing and other objects in view, this invention will now be more fully described, and other objects and advantages thereof will be apparent from the following description, the accompanying drawings, and the appended claims.

Figure 1:
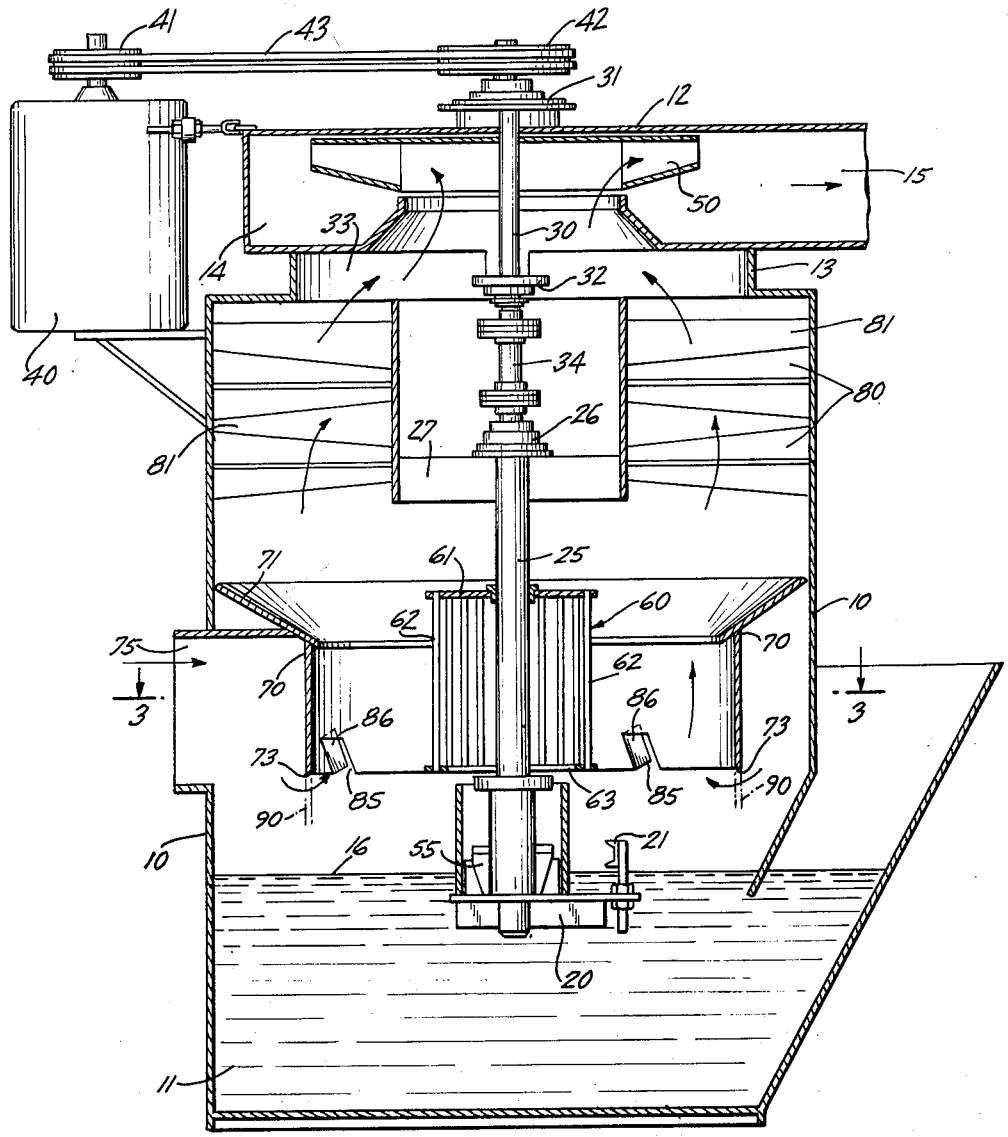
FIG. 1 is a view in vertical section of apparatus embodying and for practicing this invention.

Referring to the drawings, in which like characters of reference refer to like parts throughout the several views thereof, one form of apparatus embodying and for practicing this invention is illustrated as including an outer generally cylindrical casing 10, the lower portion of which forms a tank or reservoir 11 for washing liquid. At the top of casing 10 is mounted a fan housing 12, carried by flange 13 on casing 10 and including outlet duct 14 leading to air outlet 15. Centrally mounted in casing 10 and axially spaced below the normal level 16 of washing liquid in tank portion 11 thereof is a bearing base 20, supported by internal cross brackets 21 in known manner within casing 10, for supporting for rotation the lower end of an axial vertical distributor and impeller shaft 25, the upper end of which is mounted for rotation in bearing 26 supported on internal cross bracket 27.

Vertically mounted through fan housing 12 and above but co-axially aligned with shaft 25 is a shaft 30 serving as the drive shaft and also as the fan shaft supported for rotation in housing 12 as by top bearing 31 carried thereby and lower bearing 32 carried by internal cross brackets 33. The lower end of shaft 30 is in driving engagement with the upper end of impeller and distributor shaft 25 as through flexible coupling 34, and shafts 30 and 25 are suitably driven for rotation as by a motor 40 acting through pulley arrangements 41—42 and belts 43. Also mounted on shaft 30 for driving thereby within fan housing 12 is exhaust fan 50 for receiving air from casing 10, after washing therein, and for exhausting it through outlet duct 14 and air outlet 15. At the bottom end of shaft 25 and mounted thereon for rotation therewith is a liquid pumping impeller 55, adapted to pump water or other washing liquid from tank 11 and to force it upwardly into the interior of rotating spray-generating means illustratively shown as a rotation cage distributor 60. This spray-generating means 60 is also mounted on shaft 25 for rotation therewith, and includes a top plate 61 affixed to shaft 25, from which plate depend a plurality of spaced bars or vanes 62, the lower ends of which engage a ring 63.

Figure 2:
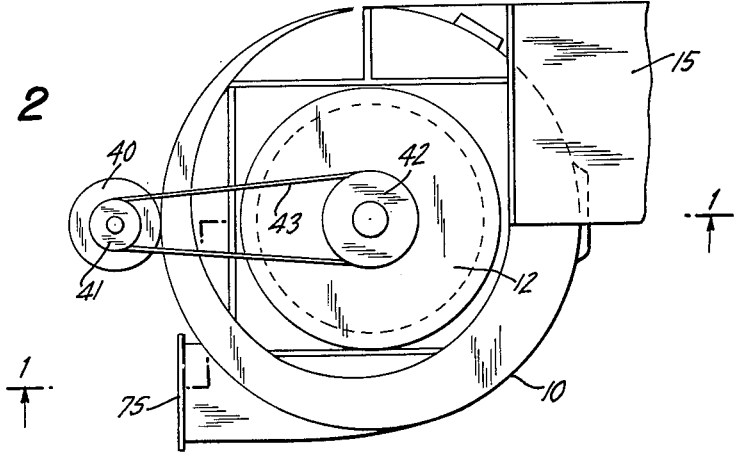
FIG. 2 is a top plan view of the apparatus of FIG. 1.

As will be apparent from the foregoing, as shaft 25 is rotated (from drive motor 40 acting through drive 41—42 and shaft 30), impeller 55 pumps or forces washing liquid from tank 11 up inside the rotating cage distributor 60, which washing liquid is flung outwardly as a rotating pattern of spray droplets (indicated at 64 in FIG. 2) into the washing space around cage 60 by the moving vanes 62 thereof impinging upon the stream of washing liquid from impeller 55.

Figure 3:
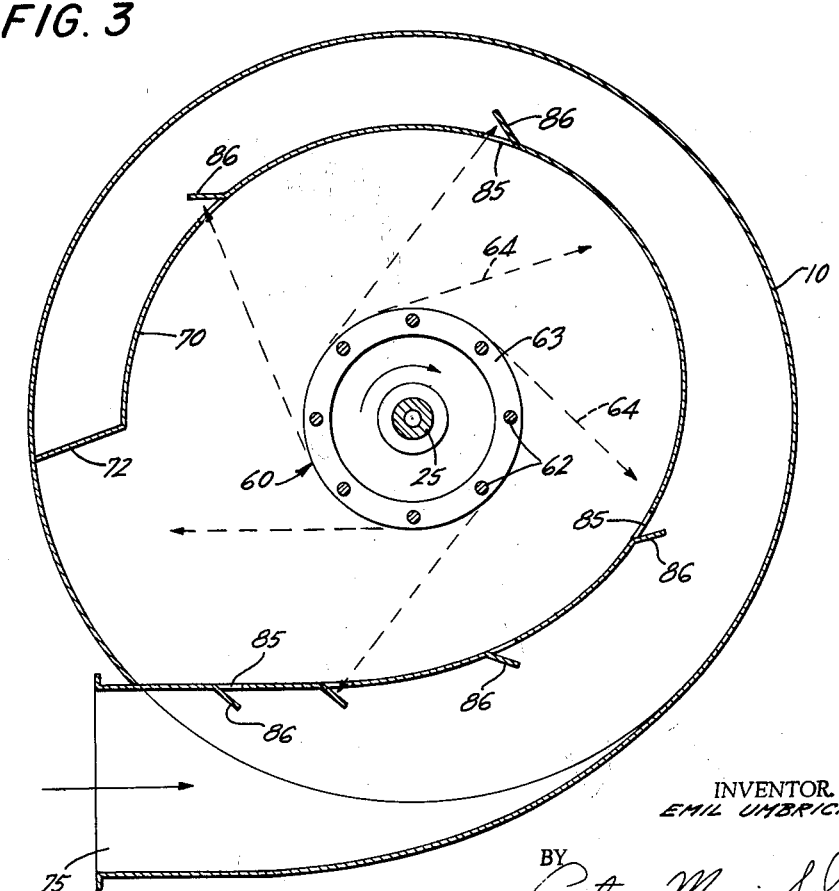
FIG. 3 is a horizontal section through the apparatus of FIG. 1 and along the line 3—3 thereof.

Also mounted within casing 10, and around rotating distributor cage 60 therein, is a vertical distributing baffle 70, non-uniformly spaced from the outer walls of casing 10 and axially positioned therein approximately adjacent the level of the lower portion of rotating cage 60, and provided with a preferably inwardly slanting top surface 71, with baffle 70 being disposed in association with an air inlet 75 through casing 10 so as to provide and define a circular path of non-uniform cross-section and tangentially arranged with respect to casing 10 and the rotating spray pattern from cage 60, as indicated more particularly in FIG. 3.

Thus, baffle 70 arranged, as indicated, forms with gas inlet 75, a tangentially disposed inlet and curved distributing path for the entering gas stream such that gas to be washed enters inlet 75 and proceeds around or through the distributing path around baffle 70 and beneath top 71 thereof, and, thus, has imparted thereto a swirling or circumferential motion as the entering air proceeds from inlet 75 around baffle 70 to the extreme end thereof which is closed by plate 72. As the air stream proceeds around baffle 70, portions of the swirling air constantly escape beneath the lower edge 73 of baffle 70 and are drawn upwardly through the rotating spray pattern 64 produced by rotating cage 60, as indicated by the flow arrows, preferably, the cross-sectional area of the distributing path radially outside baffle 70 is arranged to have a constantly diminishing cross-section to maintain substantially uniform distribution conditions on the gas stream flowing therethrough as more and more of the entering gas passes beneath lower edge 73 of baffle 70 during progress of the gas stream from inlet 75 around to the opposite end 72 of the asymmetrical and diminishing distributing path defined by baffle 70 and the top portion 71 thereof.

In the upper section of casing 10 and above distributing baffle 70 and rotating cage 60 (which generally define a washing chamber area within casing 10 in which air or gas passing therethrough is subjected to the action of the rotating spray pattern 64 of washing liquid droplets) are provided a plurality of baffle members 80, with spaces 81 therebetween, among which the gas stream is drawn by the action of fan 50, after passing upwardly through spray pattern 64, with baffles 80 providing, in known manner, for the removal of entrained moisture or droplets from the washed air. Thus, the air to be washed enters the apparatus tangentially through inlet 75, proceeds around the diminishing distributing path defined by baffle 70, during the course of which some of the swirling air spills or passes the lower edge 73 of baffle 70 substantially all around the peripheral extent thereof. Under the action of fan 50, such swirling stream of air is drawn upwardly through the rotating spray pattern 64 of washing liquid droplets from rotating cage 60 for washing contact therewith whereby entrained matter in the air is wetted or absorbed or removed by the washing liquid, and then the air continues to pass upwardly through moisture-removing or entrapping baffles 80, ultimately to be exhausted out of outlet 15 by fan 50.

Also, as indicated in the drawings, baffle 70 is preferably provided with a number of spaced spray openings 85 positioned around the lower edge thereof and situated so as to admit some of the sprayed droplets of washing liquid from cage 60 into the distributing path radially outside baffle 70 to provide a source of washing liquid therein. Also as indicated, an angularly extending deflector 86 is positioned adjacent each spray opening 85 for deflecting spray liquid entering the openings 85 both radially and axially within the space enclosed by baffle 70, and, to this end, both spray openings 85 and deflectors 86 are preferably axially positioned at an angle, inclined to the direction of rotation or path of travel of the spray pattern from cage 60, to achieve upward and outward deflection of washing liquid spray impinging thereon within the distributing path defined by baffle 70.

In this manner, spray droplets passing through spray openings 85 in baffle 70 and impinging at a high rate against angled deflectors 86 are deflected or ricocheted outwardly and upwardly into the area outside baffle 70 to provide washing liquid for flushing or otherwise removing or preventing deposition and accumulation of entrained soil material from entering air in the distributing defined by baffle 70. Additionally, such deflected spray droplets also provide some preliminary wetting or washing down of airborne particles in the entering air and prior to the time when the air flows directly through the rotating spray pattern from cage 60 to increase the washing area and/or contact available for treatment of entrained matter in the stream of gas to be washed. As indicated in more detail in FIG. 3, spray openings 85 and deflectors 86 are arranged or spaced along or around baffle 70 with regard to the differing quantities or volumes of air passing therealong at different angular portions thereof, with the concentration of spray openings 85 and deflectors 86 being greater adjacent inlet 75 than at the opposite end of baffle 70 in order to accommodate the larger quantities of air and entrained matter beneath or outside baffle 70 near inlet 75.

Preferably, the speed and pumping capacity of impeller 55 are so correlated that sufficient washing liquid from reservoir 11 is constantly urged by impeller 55 up into cage 60 to maintain a substantially continuous impingement of spray droplets against the radially inner surface of baffle 70 and through spray openings 85 thereof so that a substantially continuous layer or curtain is formed to drain down the inner wall of baffle 70, and particularly so that washing liquid drains off the bottom edge 73 of baffle 70 in a substantially continuous annular curtain or screen of liquid (indicated by dot-dash lines 90), which curtain of draining washer liquid is also augmented by liquid draining from the radially outer walls of baffle 70 after having been deflected thereagainst by deflectors 86. In this manner, the entering air, as it spills beneath lower edge 73 of baffle 70, must pass through this curtain or screen 90 prior to rising through the spray pattern of droplets from rotating cage 60, for an added washing effect. Thus, the downwardly flowing curtain of washing liquid 90 from the bottom edge of baffle 70 cooperates with the abrupt change of direction of the air stream under the bottom edge 73 of baffle 70 to assure substantially complete removal therefrom of at least the heavier entrained material, etc., so that little, if any, of such entrained material is left for entrapment along with moisture or droplets of washing liquid on baffles 80 in the upper part of chamber 10.

The added efficiency of gas washing apparatus in accordance herewith attributable to the tangential arrangement or inlet of gas to be washed and the swirling motion imparted thereto by the curved distributing path defined by baffle 70, and the swirling passage of the gas upwardly through the wash liquid spray pattern is even further enhanced, particularly for the removal of very minute solid particles of micron and sub-micron size, if tangential inlet 75 and baffle 70 are arranged, as indicated in FIG. 3, to impart the swirling motion of inlet air a circumferential direction whereby the swirling air movement is opposite to the direction of travel of the washing liquid droplets 64 being flung outwardly by the rotating distributor cage 60. That is, washing liquid spray 64 is ejected from rotating cage 60 in a direction almost tangential to the periphery of the cage. Accordingly, air inlet 75 is preferably oriented, as in FIG. 3 in which distributor 60 is illustrated in a clockwise direction, so that the tangentially directed swirling air entering the washing chamber from beneath lower edge 73 of baffle 70 will be moving in a direction opposite to (e.g., counter clockwise) the direction of movement of spray droplets 64 in the washing liquid spray. Consequently, there is an increase in the force of impact between spray droplets and entrained particle pollutants in the air to be washed so as to gain the advantage which increased impact force contributes to wetting, collecting, and removing of entrained matter, and particularly the further increased efficiency in the moving very minute solid particles. Alternatively, if it is predominantly gaseous entrained matter, rather than solid soils, which it is desired to collect or remove from the air being treated, as by the absorption thereof on washing liquid droplets, it may be preferred to orient the inlet 75 and baffle 70 with respect to the direction of rotation of cage 60 in an opposite manner so as to prolong contact time between the spray droplets and entrained gaseous soils in the swirling air for increasing absorption thereof.

As will be apparent from the foregoing, the size and configuration of baffle 70 is correlated with the size of the apparatus and flow of air entering inlet 75 so that the spilling of air underneath edge 73 of baffle 70 all along the circumferential extent thereof is substantially uniform or equalized by the gradually diminishing cross section of the distributing path radially outside of baffle 70 and, particularly, so that the relatively large amount of air lost or spilled beneath edge 73 of baffle 70 in the first quadrant thereof adjacent inlet 75 will not disrupt or cause abnormal flow around the remainder of baffle 70, while also providing or compensating for the loss of air around baffle 70 to avoid or minimize either excessively high linear velocities of the air and/or static shock at the end of the distributing path restricted by baffle 70, all to avoid or minimize non-uniform channeling of the air passing through the rotating spray pattern from cage 60 for substantially uniform spraying or washing of the air over the whole extent of washing area defined by the rotating spray pattern. In this connection, it may be desired to have baffle 70 extend completely around the whole inner periphery of casing 10 and/or only partially therearound as indicated in FIG. 3, depending upon the particular flow conditions encountered.

As purely illustrative of the application of such considerations to the dimensioning or configuration of apparatus embodying and for practicing this invention, it may be noted that satisfactory results have been achieved with apparatus such as illustrated and designed to accommodate approximately 20,000 c.f.m. throughput of a stream of air to be washed, and having an internal diameter of casing 10 of approximately 8½ feet, while a device designed to accommodate 4,000 c.f.m. may have a diameter of about 4 feet. In such apparatus, the height of baffle 70 is satisfactorily about 21 inches, while the transverse or radial dimension varies from about a 24 inch width at inlet 75 down to about a 12 inch width at the opposite end 72 of baffle 70—i.e., with the cross section of the curved distributing path defined by baffle 70 diminishing approximately one half from the air inlet to the opposite end of the baffle.

In such a construction, satisfactory results are also achieved with the provision of spray openings 85 in baffle 70 of a width of approximately 4½ inches, while the axial extent of the inclined opening is about 5 inches and with openings 85 inclined toward the direction of approaching air at an angle of about 45° with respect to the bottom edge 73 of baffle 70. Deflectors 86 are satisfactorily provided with an axial extent substantially equivalent to openings 85 (deflectors 86 being, preferably, merely punched out of openings 85), and may satisfactorily extend from baffle 70 for about 3½ inches and be inclined to the surface of baffle 70 by an angle of approximately 45°. As will be understood, of course, the foregoing sizes and configurations are merely for purposes of illustrating a particular embodiment of apparatus in accordance herewith with which satisfactory results are achieved, although such dimensions will be varied in accordance with the various operating factors noted above.

Regarding, particularly, the embodiment thus described, actual comparative runs or demonstrations for testing (utilizing standard ASP 100 pigment as a test dust deliberately entrained in air to be washed) showed a substantial increase in efficiency of such washing apparatus with the provision of an asymmetrically arranged baffle such as 70 with diminishing cross section for defining a distributing path for tangentially entering air, and that such construction substantially increased the uniformity of air treatment in the area of the rotating spray pattern and equalized the air flow around the baffle and the passage or loss of air from the flowing stream beneath lower edge 73 thereof for generally enhanced results. Additionally, similar tests or demonstrations utilizing the entrainment of the pre-determined amount of test pigment in the air and comparative measurements of the amount still retained in treated air exiting from air outlet 15 also demonstrated that the provision of spray openings 85 and deflectors 86 associated therewith gave further enhancement of the efficiecny or completeness of washing treatment in accordance with such apparatus and, furthermore, avoided or minimized the undesired deposition or accumulation of solid material on the radially outer surfaces of baffle 70 or the under surface of the cover 71 thereof by providing for controlled and spaced admission and deflection of a portion of the spray droplets into the distributing path defined by baffle 70.

Observation during such determinations also indicated that the configuration of baffle 70 and the asymmetrical or diminishing cross section thereof in accordance herewith also exercised a further equalizing or beneficial effect on the uniformity of air flow at various portions around the periphery of the spray pattern area of the apparatus by decreasing the linear velocity of the air leaving baffle 70 to pass upward through the rotating spray pattern, as well as equalizing or making more uniform throughout the whole cross section of the washing chamber the quantities of swirling air passing therethrough.

Thus, there is provided in accordance with the foregoing gas washing apparatus of increased efficiency and in which the washing or removing impact force between washing liquid droplets and entrained matter in the stream of gas to be washed is effectively increased as may be desired and enhanced for greater washing or removing efficiency in terms of the size of the apparatus, the desired throughput rate of gas volume, the horsepower required for moving both the gas to be washed and the washing liquid spray, and the amount of entrained matter in the stream of gas to be washed. Similarly, the provision of an asymmetrical distributing baffle increases the uniformity of distribution of air presented to the rotating spray pattern, and notwithstanding the swirling motion of the air, for more uniform distribution over the whole available area of the spray pattern, while also providing for a self-cleaning arrangement to remove or prevent soil deposits on the inlet or distributing baffle, and for additional pre-treatment of the stream of gas to be washed, both in the distributing path enclosed by the baffle and as the air passes beneath the lower edges of the baffle, for enhanced and preliminary removal of at least gross soils prior to final washing of the air as it passes upwardly through the rotating spray pattern of washing liquid droplets. Furthermore, such enhancements of efficiency and advantages and operating ease are accomplished substantially without undesirably complicating or enlarging the gas washing apparatus involved, as well as without substantial or undesired flow resistance to the stream of gas being washed or requiring additional horsepower to draw the desired volume of gas stream through the apparatus at the desired rate of flow.

There is described and shown herein a preferred embodiment of this invention and various modifications thereof; but it is to be understood that these are not intended to be exhaustive or limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

What is claimed is:

1. Gas washing apparatus of the character described for washing and removing entrained matter from a stream of gas to be washed by subjecting said stream of gas and said entrained matter therein to the action of a rotating spray pattern of washing liquid droplets, comprising in combination an outer casing for said apparatus having a gas outlet in the upper portion thereof, fan means adjacent said outlet for drawing said stream of gas to be washed through said casing for discharge through said outlet, rotating spray distributor means mounted for vertical rotation within said casing in the lower portion thereof and vertically spaced below said outlet, said distributor means including a cage of spaced vertical bars rotatable about a vertical axis for hurling washing liquid impinging thereon outwardly at high velocity to form said rotating spray pattern, means for pumping washing liquid into said cage for impingement against said bars, gas inlet means for introducing gas to be washed into said apparatus axially adjacent the lower portion of said spray pattern and tangentially with respect to rotation of said spray pattern, a generally circular deflecting baffle surrounding at least the lower portion of said rotating spray pattern and being radially spaced from both said distributing means and said casing, said circular baffle having vertical walls around said spray pattern and a transverse top radially outwardly extending therefrom and forming with said tangential inlet a generally circumferential distributing passage for conducting said stream of gas to be washed in a generally circumferential distributing path from said inlet around the outside of said baffle and around said rotating spray pattern, the lower edge of said vertical walls of said baffle being spaced from said casing whereby portions of said stream of gas to be washed are drawn by said fan means under said lower edge from outside said baffle to the inside thereof for upward passage through said rotating spray pattern, and said baffle being asymmetrically disposed within said casing providing a decreasing cross-sectional area of said distributing passage around said baffle for said stream of gas to be washed as said passage leads around said casing away from said gas inlet whereby said stream of gas to be washed entering said gas inlet is distributed with substantial uniformity all around the cross-sectional area defined by said rotating spray pattern and enclosed by said baffle as portions of said stream of gas flow under said lower edge of said baffle along and around the circumferential extent thereof as the cross-sectional area of said distributing passage diminishes.

2. Apparatus as recited in claim 1 which also includes a plurality of spray-admitting apertures in said lower edge of said baffle for admitting to selected areas of said distributing passage spray droplets from said rotating spray pattern for washing from said distributing passage outside said baffle deposits of said entrained matter in said stream of gas to be washed which may accumulate by impingement of said stream of gas against the wall of said outer casing.

3. Apparatus as recited in claim 2 which also includes angled deflector plates adjacent said apertures for deflecting spray droplets admitted therethrough across and into said distributing passage outside said baffle.

4. Gas washing apparatus as recited in claim 2 in which said spray-admitting apertures are positioned along said lower edge of said baffle in non-uniform spaced relation with said apertures being closer together and more numerous along portions of said distributing passage near said inlet than along portions of said distributing passage further from said inlet for concentrating spray droplets admitted into said distributing passage through said apertures in areas of said passage in which accumulation of entrained material on the wall of said outer casing is concentrated.

References Cited in the file of this patent

UNITED STATES PATENTS

| | | |
|---|---|---|
| 1,264,263 | Brassert | Apr. 30, 1918 |
| 1,835,559 | Cutler | Dec. 8, 1931 |
| 2,575,359 | Ortgies | Nov. 21, 1951 |
| 2,599,202 | Schimpke | June 3, 1952 |
| 2,698,672 | Burnside et al. | Jan. 4, 1955 |
| 2,889,005 | Umbricht | June 2, 1959 |